United States Patent
Guizot et al.

[19]

[11] Patent Number: 6,131,470
[45] Date of Patent: Oct. 17, 2000

[54] FLUIDIC METER OF REDUCED SIZE

[75] Inventors: Jean-Luc Guizot, Charenton le Pont; Luc Hernoux, Colombes; Andrew John Parry, Bourg le Reine, all of France

[73] Assignee: Schlumberger Industries, S.A., Montrouge, France

[21] Appl. No.: 09/078,125

[22] Filed: May 13, 1998

[30] Foreign Application Priority Data

Jun. 6, 1997 [FR] France .................................. 97 07058

[51] Int. Cl.[7] ........................................................ G01F 1/22
[52] U.S. Cl. ........................................................ 73/861.19
[58] Field of Search ........................... 73/861.19, 861.21, 73/202

[56] References Cited

U.S. PATENT DOCUMENTS 4,911,007  3/1990  Churchill et al. .................... 73/861.19
4,976,155  12/1990  Challandes ........................... 73/861.19
5,864,067  1/1999  Ligneul et al. ....................... 73/861.21

FOREIGN PATENT DOCUMENTS 9033303  7/1995  Japan .

Primary Examiner—Harshad Patel
Attorney, Agent, or Firm—Leonard W. Pojunas

[57] ABSTRACT

The invention concerns a fluid meter including a body comprising a fluid intake opening and a fluid evacuation opening aligned along a first direction A, a measuring unit formed of a fluid oscillator including at least one obstacle disposed into an oscillation chamber and which is provided with one fluid inlet and one fluid outlet, characterized in that the inlet and outlet of the fluidic oscillator are aligned along a second direction C approximately perpendicular to the first direction.

13 Claims, 5 Drawing Sheets

(D-D)

FLUIDIC METER OF REDUCED SIZE

The invention concerns a fluid meter including a body comprising a fluid intake opening and a fluid evacuation opening aligned along a first direction, a measuring unit formed of a fluidic oscillator including at least one obstacle disposed inside an oscillation chamber provided with for one fluid inlet and one fluid outlet.

Figure 1:
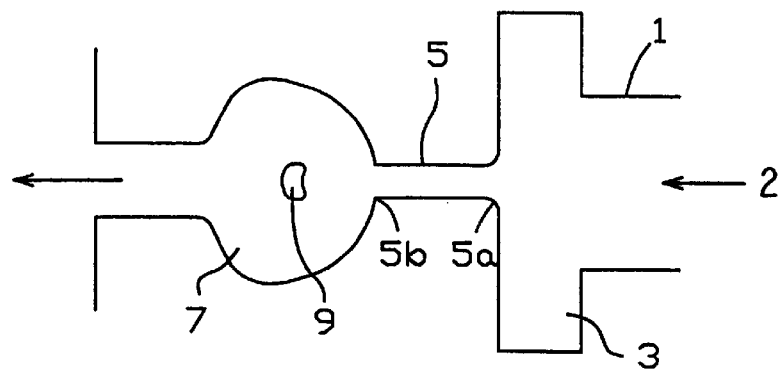

This type of fluid meter is widely known and the document JP 09033303-A provides an example of this, as shown on FIG. 1.

In the meter, the fluid enters through the intake opening 1 along a given longitudinal direction into a first large chamber 3 which slows down the liquid flow. The fluid then penetrates along this same direction into an aperture 5 via one end 5a of the latter which is elongated along said direction and has a reduced transverse width. The aperture is also elongated along the other transverse dimension (height) perpendicular to the width.

At the opposite end 5b of the aperture, the fluid appears in the form of a jet which enters into a second oscillation chamber 7 in which an obstacle 9 is positioned opposite the aperture.

On account of natural instabilities, the fluid oscillates transversally with respect to the longitudinal direction on entering the obstacle and flows alternately to the left and right of the obstacle so as to leave the oscillation chamber and meter along said longitudinal direction.

However, meters of this type do occupy a large amount of space which represents a real problem when the available dimensions for installing meters on pipes are relatively small.

The aim of the present invention is to resolve this problem by providing a fluid meter including a body comprising a fluid intake opening and a fluid evacuation opening aligned along a first direction, a measuring unit formed of a fluidic oscillator including at least one obstacle disposed inside an oscillation chamber and which is provided with one fluid inlet and one fluid outlet, characterised in that the inlet and outlet of the fluidic oscillator are aligned along a second direction approximately perpendicular to the first direction.

In this configuration, the large longitudinal dimension of the meter between the inlet and the outlet of the fluidic oscillator is retained, but inside a plane perpendicular to the first alignment direction of the fluid intake and evacuation openings.

According to one characteristic of the invention, the body comprises a first wall and second wall opposing each other which partially delimit the oscillation chamber.

According to another characteristic, the first wall, known as the deflection wall, is situated opposite the fluid intake opening so as to provide the fluid with a direction approximately perpendicular to the first direction and a direction opposing that of the fluid circulating in the fluidic oscillator.

Again, according to other characteristics:
- the body comprises one or several passages which direct the fluid deflected by the first wall along the second direction towards the inlet of the fluidic oscillator,
- the body comprises one or several passages at the outlet of the fluidic oscillator, said passages directing the fluid along a direction approximately perpendicular to the first direction and in a direction opposing that of the fluid circulating in the fluidic oscillator,
- the second wall, known as the guiding wall, directs the fluid towards the evacuation opening,
- the second wall is situated opposite the fluid evacuation opening.

It is sufficient for at least one of the first and second walls to be able to be mounted on the measuring unit, the other being able to be an integral part of the measuring unit so as to be able to install the obstacle inside the oscillation chamber and mount flow sensors on or in the attached wall.

The obstacle and the inlet of the fluidic oscillator preferably have an elongated shape along a direction approximately perpendicular to the first and second walls which makes it possible to easily mount said obstacle in the oscillation chamber by positioning it on the wall opposite the one to be mounted.

In addition, this advantageous disposition makes it possible to further reduce the spatial requirement of the meter between the intake and evacuation openings as the size of the measuring unit along the first direction corresponds to the height of the obstacle and not to the width or transversal dimension of the oscillation chamber.

According to one characteristic, the body comprises two lateral walls framing a central block including the measuring unit and each being delimited by firstly one of the first and second walls, and secondly by a wall situated opposite said first or second wall and in which the corresponding fluid intake and evacuation opening is fitted.

When the two lateral portions are built on the central block, production of the meter body is simplified.

However, if it is necessary to reduce production costs, it is preferable that only one of the lateral portions be made up of a single piece with the central block, the other lateral portion being mounted on the central block.

Figure 2:
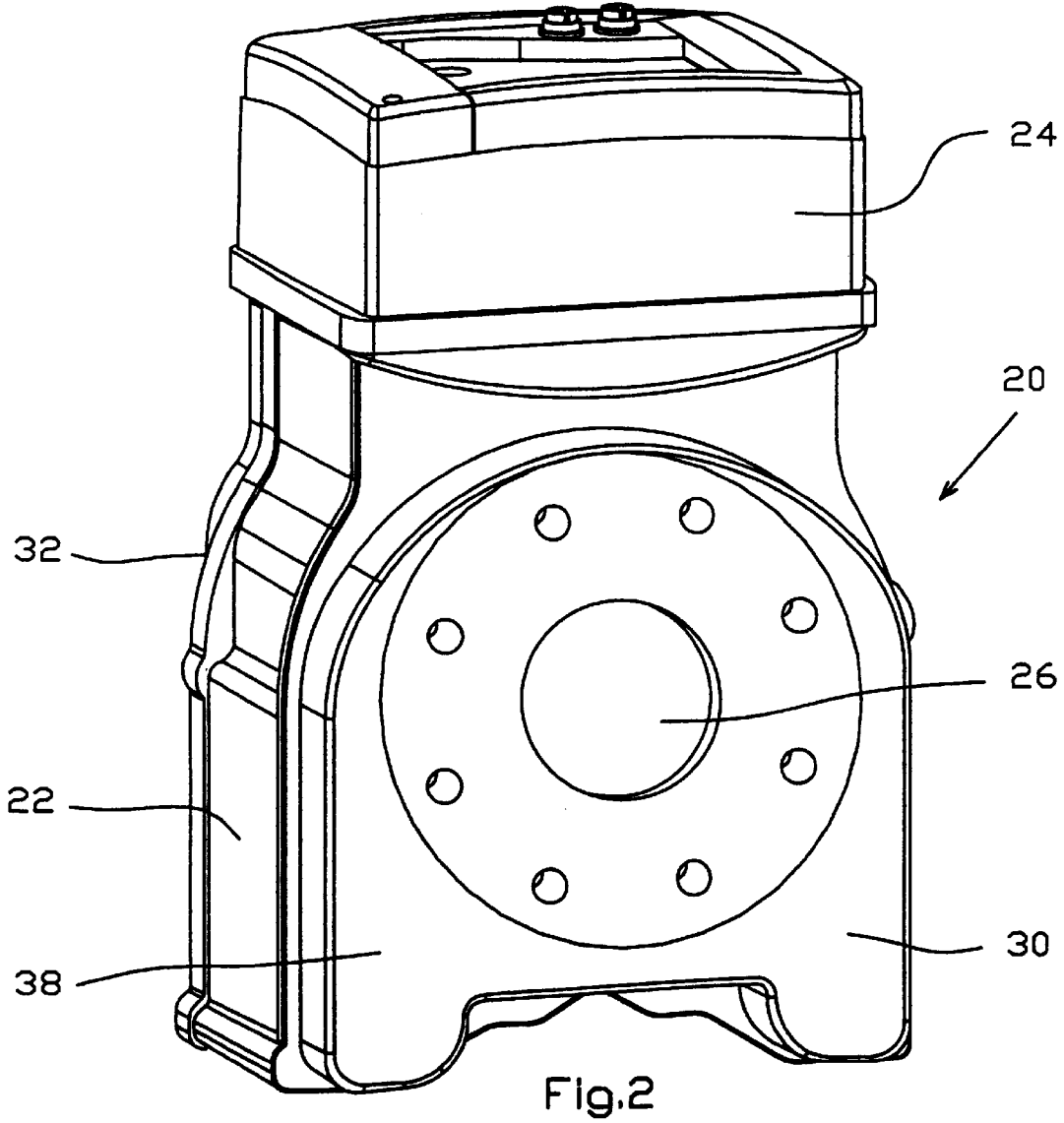
Figure 3:
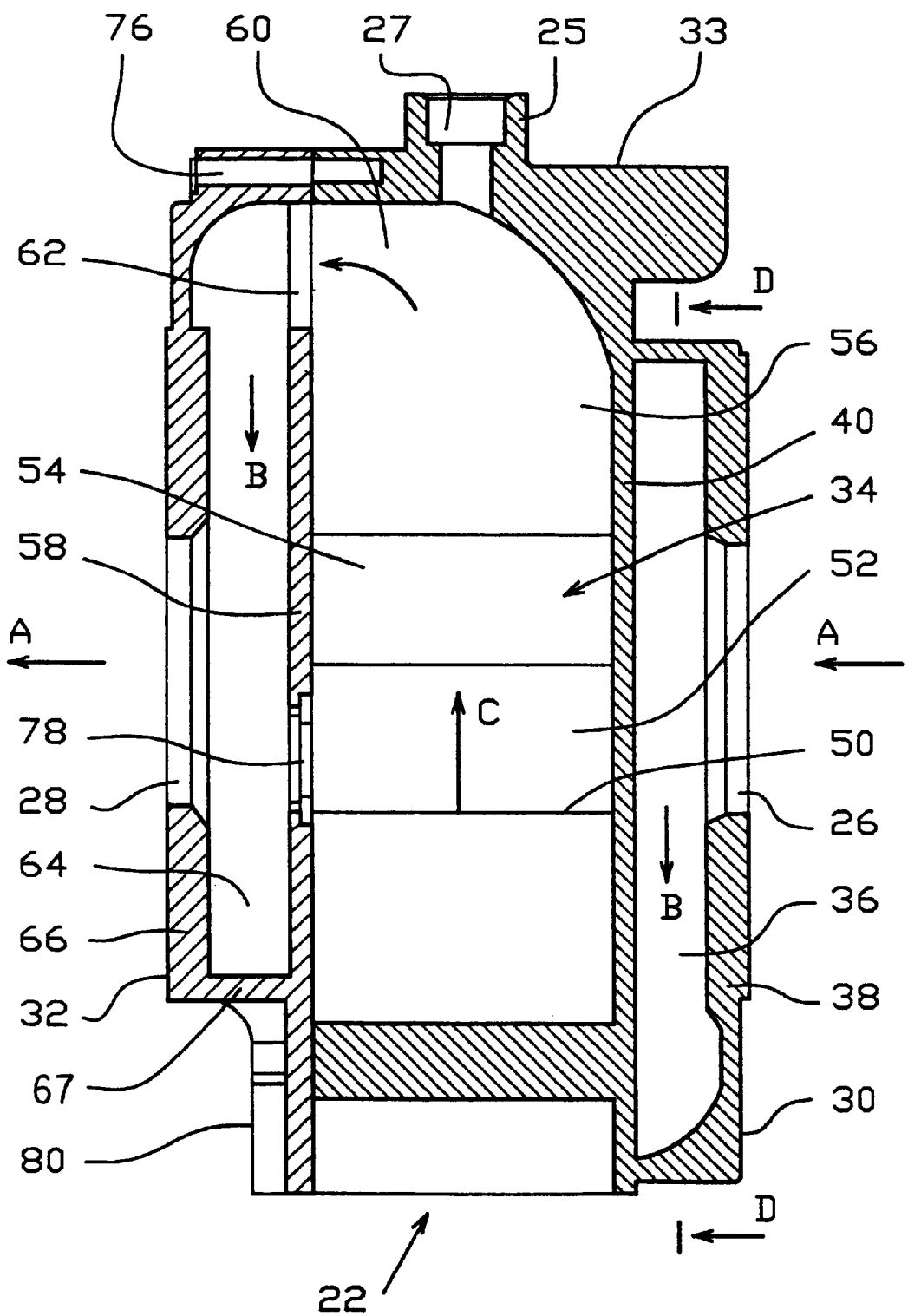
Figure 4:
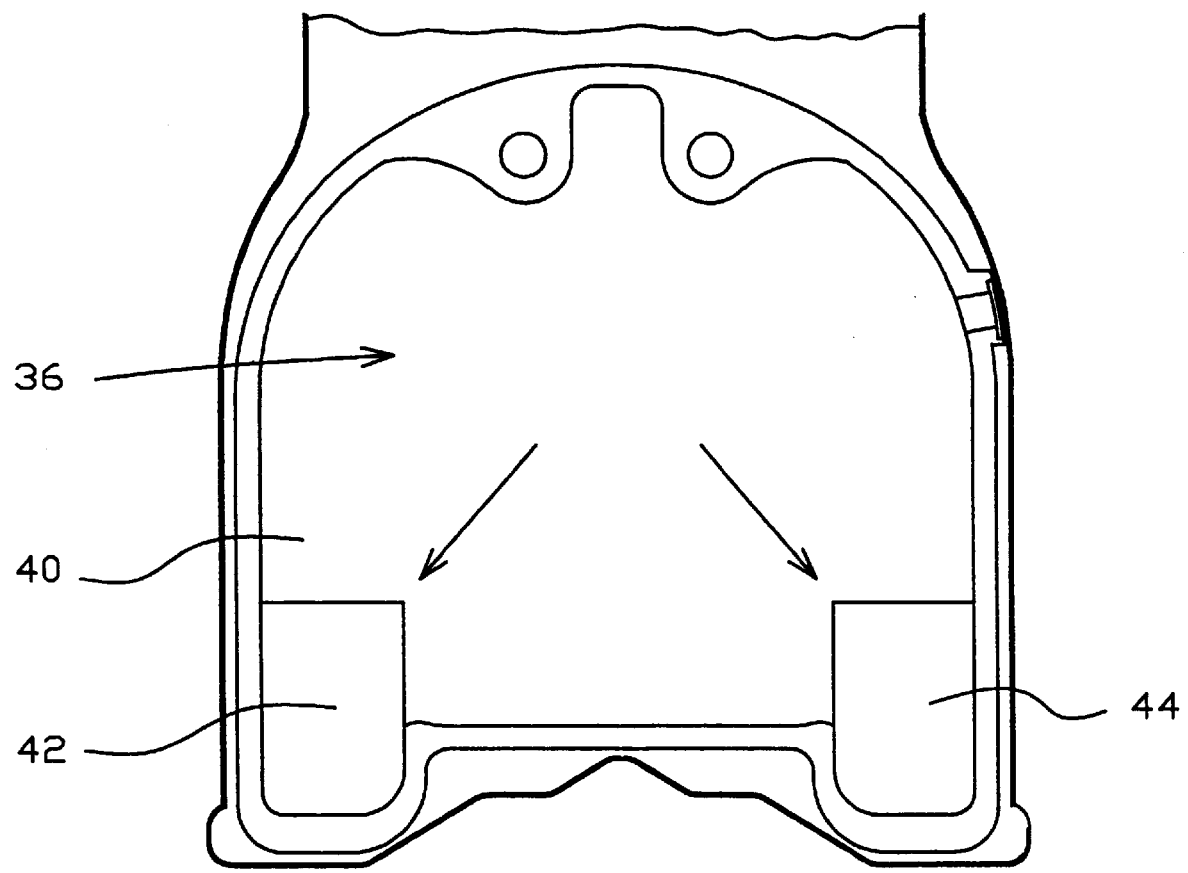
Figure 5:
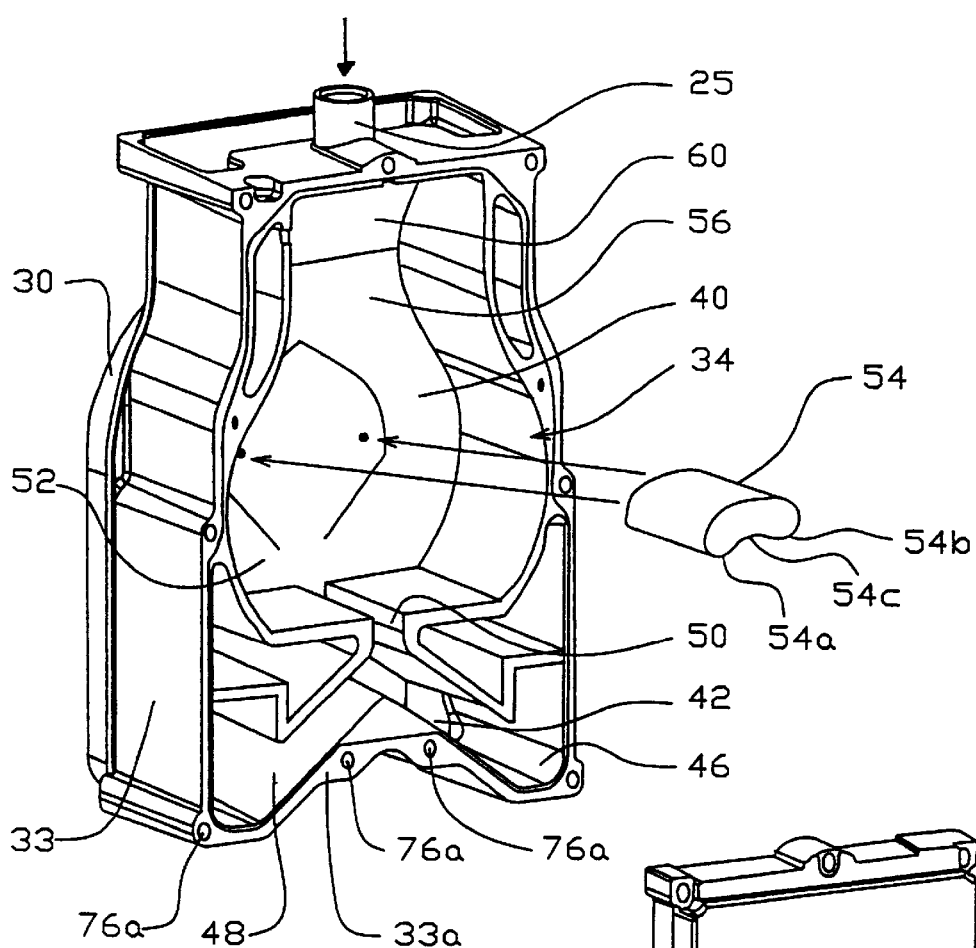
Figure 6:
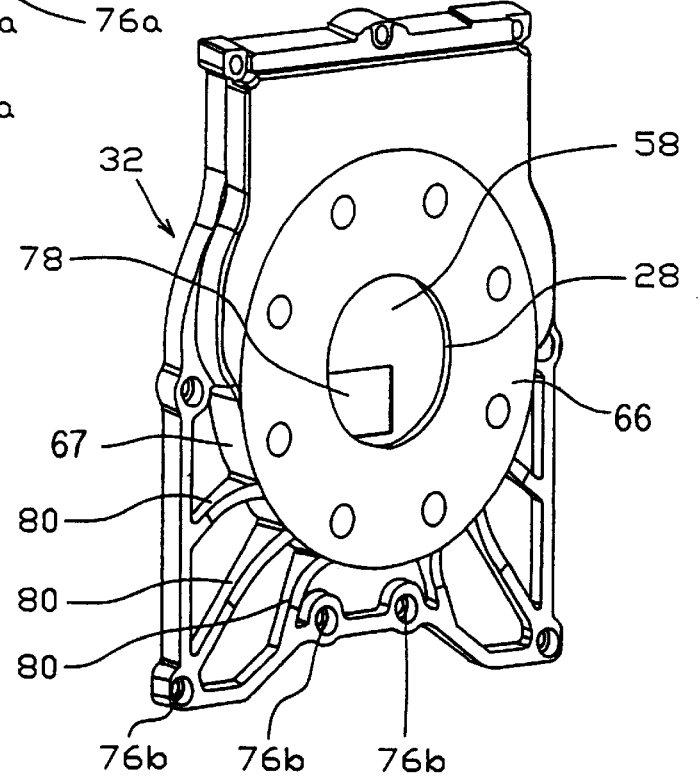
Figure 7:
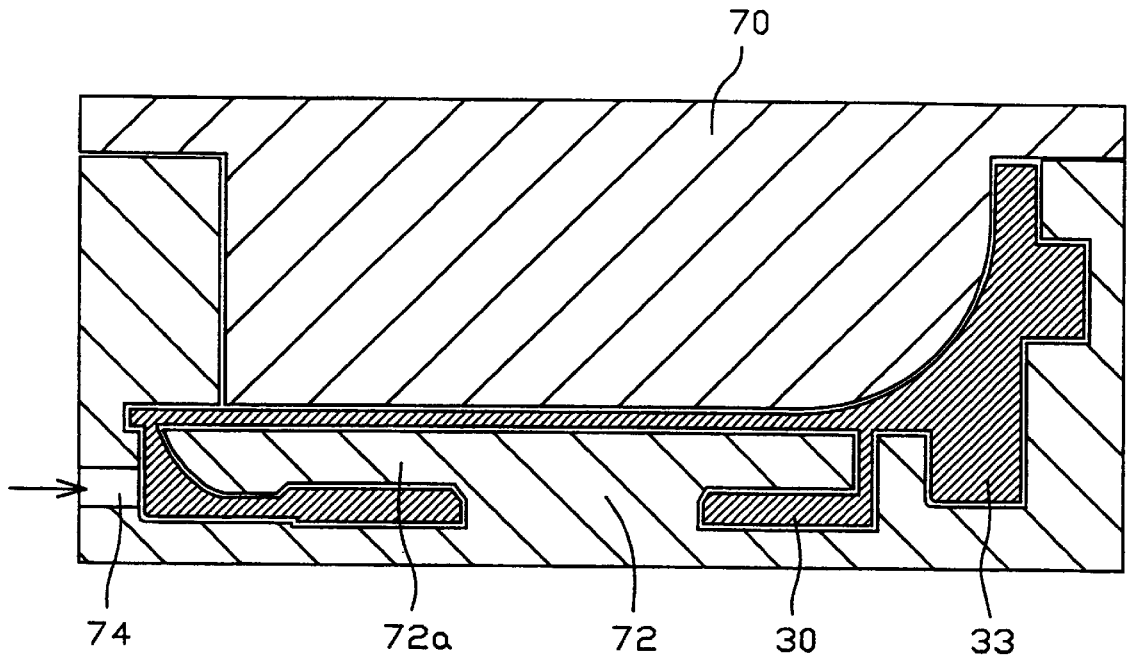
Figure 8:
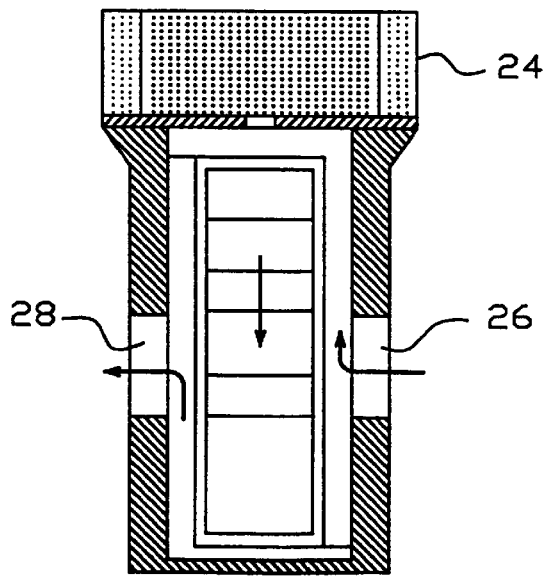

Other characteristics and advantages of the invention shall appear on reading of the following description given solely by way of example and with reference to the accompanying drawings on which:

FIG. 1 is a diagrammatic longitudinal cutaway view of a fluid meter of the prior art, FIG. 2 is a perspective view of the fluid meter of the invention, FIG. 3 is a simplified diagrammatic cross section of the meter of FIG. 2, FIG. 4 is a partial simplified view of the meter of FIG. 3 along D—D, FIG. 5 is a perspective view of the inside of the measuring unit of the meter of FIG. 2, FIG. 6 is a perspective view of the lateral portion of the meter which is built on the measuring unit represented on FIG. 5, FIG. 7 is a sectional view showing the production of the central block including the measuring unit of the meter, FIG. 8 is a view of an embodiment variant of the invention.

As shown in FIG. 2 and denoted by the general reference 20 is a gas meter according to the invention and includes a body 22 on which a totalizer 24 is mounted.

FIGS. 3 and 5 show a pipe 25 perforated with a hole 27 and disposed at the upper portion of the body 22 so as to allow for passage of electric connections between said body and the totalizer 24.

The body comprises an opening 26 for admitting fluid into the meter along a first direction marked by the arrow A and which shall subsequently be referred as 'direction A'.

FIG. 3 also shows another opening 28 for evacuating the fluid outside the meter and which is aligned with the intake opening 26 along this same direction A.

The body of the meter comprises two lateral walls 30 and 32 which frame a central block 33 including a measuring unit 34 as represented on FIG. 3.

The lateral wall 30 defines inside an upstream chamber 36 represented on FIGS. 3 and 4 and in which the fluid is introduced after having passed through the intake opening 26.

This chamber is delimited by a wall 38 in which the opening 26 is disposed and by another wall 40 disposed opposite.

This wall 40, known as the deflection wall, receives the impact of the flow of the fluid originating from the opening 26, splits it up and deflects it in a descending direction marked by the arrow marked B on FIG. 3 and which is approximately perpendicular to the first direction A.

FIG. 4 shows the inside of the upstream chamber 36 and two arrows directed towards two orifices 42, 44 fitted in the deflection wall 40 indicate the direction taken by the split up flow.

As represented in FIG. 5, two passages 46 and 48 respectively extend the orifices 42, 44 and direct the fluid flow portions by making them converge towards the inlet 50 of the measuring unit 34. This inlet has the general shape of an elongated aperture along the direction A.

By way of variant, these two passages 46, 48 could be replaced by a single passage extending a single orifice (instead of the two orifices 42, 44) which would, for example, be disposed between the existing two orifices 42, 44.

The fluid with the inlet 50 of the measuring unit flows in a direction opposing that of the fluid in the chamber 36 (arrow B) along the second direction marked by the arrow C shown in FIG. 3 and which is perpendicular to the first direction A.

The measuring unit 34 includes an oscillation chamber 52 (FIGS. 3 and 5) in which an obstacle 54 is positioned along the two arrows indicated on FIG. 5 facing the inlet 50.

The obstacle has a general elongated shape along the direction A.

The obstacle has in its frontal portion opposite the aperture 50 a central cavity 54c and two convex lateral faces 54a, 54b framing said cavity.

The fluid opening into the oscillation chamber and meeting the frontal portion of the obstacle 54 oscillates transversally with respect to the direction C inside a plane parallel to the wall 40 and flows alternatively on both sides of said obstacle so as to leave the oscillation chamber via the outlet 56 along this direction C.

The inlet 50 and outlet 56 of the oscillation chamber are aligned along the direction C which is perpendicular to the direction A for admitting and evacuating the fluid, and the spatial requirement of the meter between its intake 26 and evacuation 28 openings is thus considerably reduced.

The meter may then be placed at the level of its intake 26 and evacuation 28 openings between two pipes placed closer together than in the prior art.

Therefore, the measuring unit 34 has an elongated shape along the direction C and could take various orientations inside the plane perpendicular to the direction A.

The oscillation chamber 52 is delimited by firstly the wall 40 and secondly by another wall 58 parallel to said wall 40 (FIGS. 3 and 6).

The fluid leaving the oscillation chamber runs along the passage 60 which forms an elbow to give the fluid the direction B.

The passage 60 extends on both sides of the wall 58 in which an orifice 62 is provided (FIG. 3).

By way of variant, this passage could be replaced by two or more than two passages.

After having traversed the orifice 62, the fluid penetrates into a downstream chamber 64 disposed inside the other lateral portion 32.

This chamber is delimited by a wall 66 in which the evacuation opening 28 is fitted and by the wall 58 disposed opposite (FIG. 6). A peripheral wall 67 perpendicular to these two walls 58, 66 connects them.

The guiding wall 58 guides the fluid circulating in the chamber 64 until it comes out through the evacuation opening 28 where it rediscovers the flow direction A.

As shown in FIGS. 2 to 6, the lateral portion 30 is made of a single piece with the central block 33 of the body 22 which includes the measuring unit 34, and the other lateral portion 32, made separately, is then mounted on the central block so as to serve as a cover.

The production of the lateral portion 30 integrated with the central block 33 of the body 22 is illustrated in FIG. 7.

This figure shows two elements 70, 72, for example, made of compacted synthetic sand in resin boxes and are disposed with one inside the other and their shapes are such that the defined internal space exactly reproduces the shape of the lateral portion and that of the central block of the body.

A hole 74 is provided in the external portion of the element 72 so as to introduce into it molten aluminum which shall flow via gravity into the internal space between the elements and fill it. After having cooled the unit and subjected it to vibrations so as to break the non-ejectable portion 72a of the element 72, the element formed from the lateral portion integrated with the central block of the body is obtained.

As the number of elements making up the body is reduced to two, so as to assemble them sealed, it is only necessary to machine two faces, namely 33a (FIG. 5) of the central block 33 to which the lateral portion 32 is to be secured, and 32a (FIG. 3) of the lateral portion 32, and a single gasket is required between the mounted lateral portion and the central block.

In addition, the number of fastening screws to be inserted in the holes 76a, 76b (FIGS. 5 and 6) respectively made in the central block 33 and the lateral portion 32 is also limited with respect to a meter in which two covers are mounted.

This advantageously makes it possible to reduce production costs.

It would be possible to form the entire body of the meter including the obstacle 54 as a single piece by a technique similar to the one mentioned above so as to improve the imperviousness of the meter, suppress machining of the two faces to be placed in contact, and to reduce the labour cost of the assembly, but it is preferable to retain two elements to be assembled (body and lateral portion) so as to be able to better control the quality and accuracy of the shapes of the inlet 50 and the obstacle 54 in the oscillation chamber.

Furthermore, FIGS. 3 and 6 show a cavity 78 made in the wall 58 so as to enable flow sensors (not shown, such as thermal sensors, pressure sensors, . . . ) inside said wall to detect oscillations of the fluid in the oscillation chamber.

So as to be able to install these sensors in the cavity, it is therefore preferable for the lateral portion 32 to be separated from the central block 33.

However, it could be possible for this portion to be the lateral portion 30 to be separated from the central block, and in this case it would be preferable that the cavity 78 be fitted inside the wall 40 so as to simplify mounting of the sensors.

When the gas meter is functioning, it carries the fluid under a pressure of several bars, and so as to avoid any deformation of the lateral portion 32, reinforcement ribs 80 are provided on said portion (FIG. 6). These ribs extend onto the outer face of the wall 58 between the wall 67 and the periphery of said wall 58.

The mounted lateral wall 32 can also be made up of several elements instead of consisting of a single piece, one of the elements, namely the wall 58, being mounted on the central block, the others being mounted on said wall 58.

However, from the point of view of imperviousness, this solution is less effective.

FIG. 8 shows an embodiment variant in which the fluid penetrating into the upstream chamber via the intake opening 26 is directed upwards in the direction of the totalizer 24, is redirected downwards to the inside of the fluidic oscillator, leaves the latter via the bottom and is then redirected upwards into the downstream chamber before leaving it through the evacuation opening 28.

What is claimed is:

1. A fluid meter installed on a pipe for measuring the flowrate of the fluid flowing through said pipe, said meter including a body comprising a fluid intake opening and a fluid evacuation opening aligned along a first direction A, said intake and evacuation openings being in-line with said pipe, a measuring unit formed of a fluidic oscillator including at least one obstacle disposed in an oscillation chamber and which is provided with one fluid inlet and one fluid outlet, said inlet and outlet of said fluidic oscillator being aligned along a second direction C approximately perpendicular to the first direction.

2. A fluid meter according to claim 1, in which the body comprises a first wall and second wall opposite each other which partially delimit the oscillation chamber.

3. A fluid meter according to claim 2, in which the first wall known as a deflection wall is situated facing the fluid intake opening so as to give the fluid a direction B perpendicular to the first direction, and a direction opposing that of the fluid circulating in the fluidic oscillator.

4. A fluid meter according to claim 3, in which the body comprises one or several passages which direct the fluid deflected by the first wall along a second direction C towards the inlet of the fluidic oscillator.

5. A fluid meter according to claim 4, in which the body comprises one or several passages at the outlet of the fluidic oscillator and which direct the fluid along a direction approximately perpendicular to the first direction and in a direction opposing that of the fluid circulating in the fluidic oscillator.

6. A fluid meter according to claim 5, in which the second wall, known as a guiding wall, directs the fluid towards the evacuation opening.

7. A fluid meter according to claim 6, in which the second wall is situated facing the fluid evacuation opening.

8. A fluid meter according to claim 2, in which at least one of the walls is mounted on the measuring unit.

9. A fluid meter according to claim 2, in which the obstacle and the inlet of the fluidic oscillator have an elongated shape along a direction A approximately perpendicular to the first and second walls.

10. A fluid meter according to claim 2, in which the body comprises two lateral portions framing a central block including the measuring unit and each being delimited by firstly one of the first and second walls, and secondly by a wall situated facing said first or second wall respectively and in which the corresponding fluid intake and fluid evacuation openings are fitted.

11. A fluid meter according to claim 10, in which one of the lateral portions is formed of a single piece with the central block, the other portion being mounted on said central block.

12. A fluid meter according to claim 11, in which the mounted lateral portion is formed of a single piece.

13. A fluid meter according to claim 11, in which the mounted lateral portion comprises reinforcement ribs situated on the outer face of said lateral portion.

* * * * *